US006301397B1

(12) United States Patent
Jankowski et al.

(10) Patent No.: US 6,301,397 B1
(45) Date of Patent: Oct. 9, 2001

(54) SYSTEMS AND METHODS FOR ROTATING HIGH ADDRESSABILITY IMAGES (75) Inventors: Henry P. Jankowski; David Glassman, both of Rochester; Robert P. Loce, Webster, all of NY (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/223,266

(22) Filed: Dec. 30, 1998

(51) Int. Cl.[7] .................................................. G06K 9/32
(52) U.S. Cl. ............................................ 382/296; 345/126
(58) Field of Search .................................... 382/296, 297, 382/254, 307, 267, 268, 269, 299; 358/1.2, 1.16, 1.1; 348/583; 345/437, 438, 126

(56) References Cited

U.S. PATENT DOCUMENTS

| 4,437,122 | 3/1984 | Walsh et al. | 358/166 |
|---|---|---|---|
| 4,630,125 | 12/1986 | Roetling | 358/280 |
| 4,847,641 | 7/1989 | Tung | 346/154 |
| 4,933,689 | 6/1990 | Yoknis | 346/154 |
| 5,005,139 | 4/1991 | Tung | 364/519 |
| 5,027,078 | 6/1991 | Fan | 358/456 |
| 5,226,094 | 7/1993 | Eschbach | 382/41 |
| 5,237,646 | 8/1993 | Bunce | 395/117 |
| 5,274,472 | 12/1993 | Williams | 358/455 |
| 5,325,216 | 6/1994 | Auyeung | 358/479 |
| 5,353,127 | 10/1994 | Shiau et al. | 358/458 |
| 5,383,036 | 1/1995 | Mailloux et al. | 358/518 |
| 5,383,086 | 1/1995 | Wietelmann et al. | 361/152 |
| 5,387,985 | 2/1995 | Loce et al. | 358/447 |
| 5,506,699 | 4/1996 | Wong | 358/456 |
| 5,521,989 | 5/1996 | Fan | 382/270 |
| 5,528,384 | 6/1996 | Metcalfe et al. | 358/447 |
| 5,579,445 | 11/1996 | Loce et al. | 395/102 |
| 5,634,088 * | 5/1997 | Banton | 395/102 |
| 5,659,634 | 8/1997 | Yeh et al. | 382/232 |
| 5,666,470 | 9/1997 | Parker | 395/106 |
| 5,696,845 | 12/1997 | Loce et al. | 382/254 |
| 5,742,703 * | 4/1998 | Lin et al. | 382/172 |
| 5,758,034 | 5/1998 | Loce et al. | 395/102 |
| 5,768,432 | 6/1998 | Schweid | 382/237 |
| 5,809,177 | 9/1998 | Metcalfe et al. | 382/251 |
| 5,862,305 * | 1/1999 | Girmay et al. | 395/102 |

OTHER PUBLICATIONS

M. Analoui et al., "New Results on Reconstruction of Continuous–Tone from Halftone", Proceedings ICASSP (International Conference on Acoustics, Speech and Signal Processing), pp. 313–316, 1992.

Z–Fan, "Retrieval of Images from Digital Halftones," Proceedings of the International Symposium on Circuits and Systems, pp. 2477–2480, 1992.

S. Floyd et al., "An Adaptive Algorithm for Spatial Grayscale", SID (Society for Information Display), pp. 75–77, vol. 17, No. 2 Second Quarter, 1976.

(List continued on next page.)

Primary Examiner—Yon J. Couso
(74) Attorney, Agent, or Firm—Oliff & Berridge, PLC (57) ABSTRACT Image rotation systems and methods optimally rotate high addressability binary images in a compact manner. High addressability bit pixels are clustered to form multi-bit pixels. The multi-bit pixel image is rotated +/−90°. A pixel mapping method is employed that realigns high addressability pixels within each target group of pixels in a manner that maintains edge integrity, maintains density, and does not introduce additional false contours. Information regarding neighboring pixel values is used to determine edge information about a given high addressability target pixel group. The edge information includes an edge slope and edge location of the high addressability target pixel group. Based on the rotation angle and the edge information of the pixel group, the target high addressability pixel group is mapped to a preferred pattern. After mapping to a preferred pattern, the high addressability pixel group is rotated.

29 Claims, 8 Drawing Sheets

OTHER PUBLICATIONS

S. Hein et al., "Reconstruction of Continuous Tone Images from Their Error–Diffused Versions", Proceedings of the Conference on Human Vision, Visual Processing and Digital Display IV, pp. 310–324, (SPIE) vol. 1913, 1993.

C. Miceli et al., "Inverse Halftoning", Journal of Electronic Imaging, pp. 143–151, vol. 1(2), Apr. 1992.

A. N. Netravali et al., "Display of Dithered Images", SID (Society for Information Display) 1980 International Symposium, pp. 185–190, vol. 22 No. 3, 1981.

S. M. Schweisser, "A Bayesian Approach to Inverse Halftoning", Proceedings of the Conference on Human Vision, Visual Processing, and Digital Display IV, pp. 282–292, vol. 1913, Feb. 1993.

M.Y. Ting, "Error Diffused Image Compression Using a Binary–to–Gray Scale Decoder and Predictive Pruned Tree-Structured Vector Quantization", IEEE Transactions on Image Processing, vol. 3, No. 6, pp. 854–858, Nov. 1994.

Robert P. Loce et al., "Optimal Morphological Restoration: The Morphological Filter Mean–Absolute–Error Theorem," Journal of Visual Communication and Image Representation, vol. 3, No. 4, pp. 412–432 (12/1992).

E.R. Dougherty et al., "Optimal Mean–Absolute–Error Hit–or–Miss Filters: Morphological Representation and Estimation of the Binary Conditional Expectation," SPIE Journal of Optical Engineering, vol. 32, No. 4, pp. 815–827, Apr. 1993.

Paul G. Roetling et al., "Digital Image Processing Methods: Digital Halftoning (10)", Marcel Dekker, Inc. pp. 363–413 (1994).

Robert P. Loce, et al., "Enhancement and Restoration of Digital Documents: Statistical Design of Nonlinear Algorithms", SPIE—The International Society for Optical Engineering, pp. 1–50 and 102–125 (1997).

Becky Colgan ed., *Behind Hewlett–Packard's Patent on Resolution Enhancement™ technology*, Torrey Pines Reaearch, BIS CAP International, 1990, pp. 1–60.

Robert P. Loce et al.; *Facilitation of Optimal Binary Morphological Filter Design via Structuring Element Libraries and Design Constraints*, Optical Engineering, vol. 31, No. 5, May 1992, pp. 1008–1025.

Edward R. Dougherty ed., Marcel Dekker; *Mathematical Morphology in Image Processing*, pp. 43–90 (1992).

Robert P. Loce and Edward R. Dougherty; *Spatial Resolution Conversion Using Paired Increasing Operators*, Enhancement and Restoration of Digital Document, pp. 202–210, SPiE Optical Engineering Press, 1997.

David R. Cok; *Reconstruction of CCD Image Using Template Matching*, IS&T's 47$^{th}$ Annual Conference/ICPS 1994, pp. 380–385.

Edward R. Dougherty et al.; *Optimal binary differencing filters: design, logic complexity, precision analysis and application to digital document processing*, Journal of Electronic Imaging, Jan. 1996, vol. 5, No. 1, pp. 66–86.

John C. Dougherty et al.; *Model–based optical restoration of fax images in the context of mathematical morphology*, Journal of Electronic Imaging, Apr. 1994, vol. 3, No. 2, pp. 182–189.

* cited by examiner

SYSTEMS AND METHODS FOR ROTATING HIGH ADDRESSABILITY IMAGES

BACKGROUND OF THE INVENTION

1. Field of Invention

This invention relates to systems and methods for optimally rotating high addressability images. More specifically, this invention relates to systems and methods for rotating of high addressability binary images by clustering the high addressability image to form multi-bit pixels, determining neighborhood information of the multi-bit pixels in the image, and rotating while minimizing the presence of false contours, maintaining edge integrity, maintaining the density, and not introducing undesirable textures into the rotated image.

2. Description of Related Art

The digital reproduction, transfer or display of various images presently occurs using a variety of devices and systems in a variety of environments. The image may be input into a device, processed in some manner, and then output from the device, for example. In some applications, it may be necessary or desirable to convert the image between the input and the output of one device for the specific purpose of using the converted image data by another device. In other applications, it may be necessary or desirable to convert the input image for some particular application within a device itself.

The pixels in a binary image may be either on or off, i.e., black(1) or white(0), respectively. In particular, the binary image may be a high addressability binary image. A high addressability binary image is an image created by a device such that the spatial addressability of the writing spot is finer than the size of the writing spot. High addressability also often refers to an addressability resolution, in a first direction, that is finer than the spatial addressability resolution in a second direction that is, for example, perpendicular to the first direction. High addressability data can be used to render edges in text and line art regions at a high spatial precision in the high addressability direction. High addressability data can also be used in halftone regions to provide additional spatial resolution in the high addressability direction.

Figure 1:
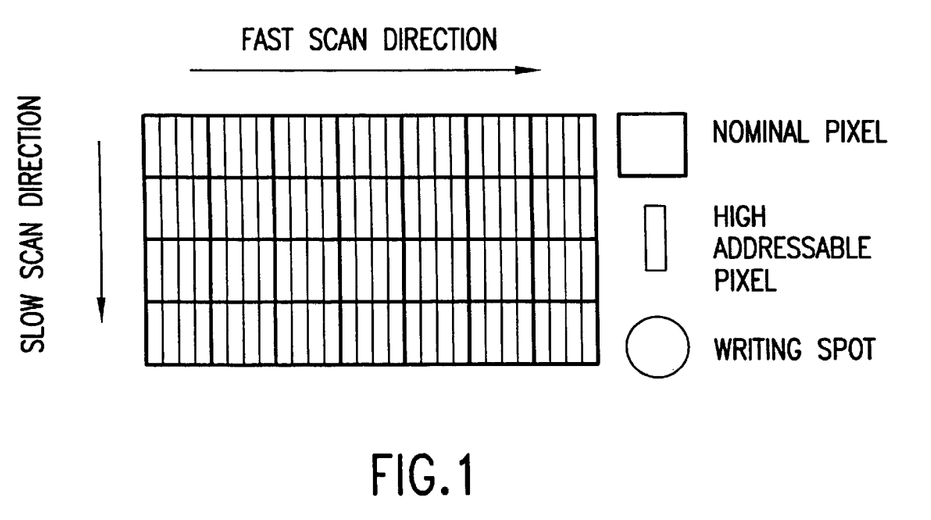
FIG. 1 is a diagram showing an exemplary conventional high addressability pixel grid.

Illustratively, FIG. 1 is a diagram showing a high addressability pixel grid. As shown in FIG. 1, the spatial addressability of the pixels in the horizontal direction, i.e., the fast scan direction, is finer than in the vertical direction, i.e., the slow scan or process direction. For a laser raster output scanner, the fast scan direction is the direction in which a laser beam of a printer, for example, sweeps to print an image on a recording medium. The recording medium may be a xerographic photoreceptor that will develop and transfer an image onto a sheet of paper, for example. The photoreceptor is advanced in a direction perpendicular to the fast scan direction, i.e., the slow scan or process direction. The photoreceptor may be advanced using rollers for a belt-type device, or the photoreceptor may be a rotating drum, as is commonly used in a printer, for example. It should be recognized that other writing devices may also have high addressability capability, such as an LED image bar writer. In these other devices, the orientation of the grids may be rotated, for example.

FIG. 1 shows the size of a nominal pixel and a high addressable pixel, as well as the size of a writing spot. The addressability in the fast scan direction is controlled by a laser beam modulator, for example. The addressability in the slow scan or process direction is controlled by the photoreceptor advance mechanism of the printer or copier. The laser beam is capable of modulation to a resolution of the high addressable pixel. However, the photoreceptor advance mechanism is not capable of such fine resolution. Rather, the paper feed mechanism is only capable of a nominal pixel resolution.

Various methods for image processing are known. These methods may encompass processing using scanning, or other image acquisition, in conjunction with printing or displaying the image. Illustratively, high addressability methods conventionally typically involve modulating a writing member, such as a laser beam, at spatial increments finer than the size of the writing spot. Using high addressability imaging and modulation allows a particular device's spatial resolution to be improved or increased without actually increasing the number of pixels or dots per unit area in the input image data.

Accordingly, high addressability techniques use modulation to increase printer spatial resolution without modifying the physical printer device. As described above, high addressability techniques may be used to affect the horizontal spatial resolution. For example, doubling the printer modulation rate results in doubling the horizontal spatial resolution, while the vertical spatial resolution remains unchanged.

SUMMARY OF THE INVENTION

However, problems occur in conventional methods when inputting, manipulating and outputting high addressability binary images. In particular, problems occur in the conventional methods when rotating high addressability binary images or image regions, such as text images or regions, line art images or regions and/or halftone images or regions, for example. In a variety of devices and operating environments, it is often necessary or desirable to rotate images or image regions. The image may be a high addressability binary image. In conventional methods and systems, rotating a grayscale image typically does not introduce defects or artifacts into the image. However, rotating a high addressability binary image, by translating unaltered high addressability pixel groups, can result in jagged edges or soft wavy edges in line art or text regions, as well as contours and undesirable textures within pictorials in the rotated image.

Conventional rotational techniques are intended for rotating images that have an isomorphic resolution, i.e., the same resolution in the vertical and horizontal directions. When rotating a high-addressability image using a conventional process, unpleasant jaggies are introduced onto the edges of line art in the rotated image. A jaggie is a binary line or stroke that appears jagged due to a relatively course sampling of the underlying image. A jaggie may also be referred to as aliasing or staircasing. Illustratively, an italic stroke in an image may be slanted and have a slope of 1-over and 4-up. Accordingly, such an image may be referred to as a 1-in-4 jaggie. These jaggies, in addition to other image artifacts such as a loss of symmetry on slanted objects, are highly objectionable. Accordingly, the conventional processes have various problems associated with them.

Accordingly, this invention provides systems and methods that optimally rotate a high addressability binary image.

This invention separately provides systems and methods that optimally rotate a high addressability image by converting high addressability bit pixels to a multi-bit pixel or cluster before rotating.

This invention separately provides systems and methods that optimally rotate high addressability line art and text edges.

This invention separately provides systems and methods for rotating high addressability pixels in an image in a compact manner that optimally maintains edge integrity in the rotated image.

This invention separately provides systems and methods for rotating high addressability pixels in an image in a manner that optimally maintains the density of the rotated image.

This invention separately provides systems and methods for rotating high addressability pixels in an image in a manner such that false contours are not introduced into the rotated image.

This invention separately provides systems and methods that use information of neighboring pixel values to optimally map a high addressability pixel group to a preferred pattern in an optimized high addressability pixel group for rotation.

This invention separately provides systems and methods for rotating high addressability images that minimize any introduced moire or pattern artifacts and textures in a rotated image.

This invention separately provides systems and methods for optimally rotating high addressability images by performing a mapping of input high addressability pixel groups to output high addressability pixel groups that are optimized for spatial translation when rotated.

In one exemplary embodiment of the systems and methods of the invention, artifact-free rotation of high addressability binary images is obtained. Illustratively, rotating the image may be performed prior to printing. In accordance with the systems and methods of the invention, an anamorphic high addressability binary image is input. The image may be in the form of high addressability bit pixels. The "anamorphic" image, due to the high addressability, possesses different spatial resolutions in mutually perpendicular directions. For example, the spatial resolution in the horizontal direction, or fast scan direction, is finer than the spatial resolution in the vertical direction, or slow scan direction. This is to be contrasted with an isomorphic image, which possesses the same spatial resolution in mutually perpendicular directions.

In accordance with one exemplary rotation technique according to the systems and methods of this invention the high addressable pixels are first clustered into isomorphic clusters. When the grid possess 4× high addressability, these resulting clusters may be referred to as pixel groups or "nibbles," which refers to a four-bit quantity. After clustering the high addressability pixels into isomorphic clusters, i.e., "isomorphic pixels" or "multi-bit pixels," the bits of the resulting isomorphic clusters, or isomorphic pixels or multi-bit pixels, are modified. Then, the isomorphic pixels can be rotated using a conventional isomorphic rotation technique.

In accordance with one exemplary embodiment of the systems and methods of the invention, the anamorphic high addressability binary image, comprising high addressability bit pixels, is redefined. That is, the high addressability bit pixels in the high addressability image are converted to multi-bit pixels that make up the image. The multi-bit pixels may be isomorphic pixels. These multi-bit pixels may also be referred to as pixel groups or clusters. Once the high-addressability pixels of the input image are transformed to the multi-bit pixels, the multi-bit pixels in the image are observed and analyzed to determine information for a target pixel or target multi-bit pixel. In particular, the multi-bit pixel neighborhood surrounding a target multi-bit pixel is analyzed. For example, the edge information of the multi-bit target pixel may be determined, as well as other attributes of the surrounding neighborhood of multi-bit pixels. In one exemplary embodiment, the sign of the local gradient, based on surrounding values of the multi-bit pixels, is determined by observing the multi-bit pixels directly above and below the target multi-bit pixel. Also, the presence of a black edge is determined by observing multi-bit pixels to the left and to the right of the target multi-bit pixel. In addition, the rotation angle and pixel value attributes may be determined for the target multi-bit pixel.

This neighborhood information, in addition to the pixel value information, for example, is then used as input data into a look-up table for the particular target multi-bit pixel. As a result, the multi-bit pixels are mapped to modified multi-bit pixels. That is, each multi-bit pixel in the image is mapped to a modified multi-bit pixels that will best optimize the rotation process. As a result, a modified image is generated, which is optimized for a particular rotation.

The mapping of the multi-bit pixels may be performed pre-rotation, post-rotation, or even during rotation, in accordance with the systems and methods of the invention. However, in accordance with the exemplary embodiments of the systems and methods of the invention described below, mapping the multi-bit pixels is performed before rotation.

After mapping and rotating, the rotated image, comprising rotated modified multi-bit pixels, is processed or transformed to convert the rotated modified multi-bit pixels back into high addressability binary pixels. That is, back to the image's original structure. It should be appreciated that the systems and methods according to the invention are applicable to a wide variety of image processes.

Thus, it should be recognized that the systems and methods described herein can be used in conjunction with various other processes and systems. For example, the systems and methods disclosed herein may be used in conjunction with or combined with the systems and methods disclosed in co-pending U.S. patent application Ser. No. 09/223,325 filed herewith, which is directed at optimally rotating high addressability binary images using averaging and filtering processes, for example, and which is incorporated herein by reference in its entirety.

These and other features and advantages of the systems and methods of this invention are described in or are apparent from the following detailed description of the exemplary embodiments.

BRIEF DESCRIPTION OF THE DRAWINGS

The exemplary embodiments of this invention will be described in detail, with reference to the following figures, wherein.

DETAILED DESCRIPTION OF PREFERRED EMBODIMENTS

Figure 2:
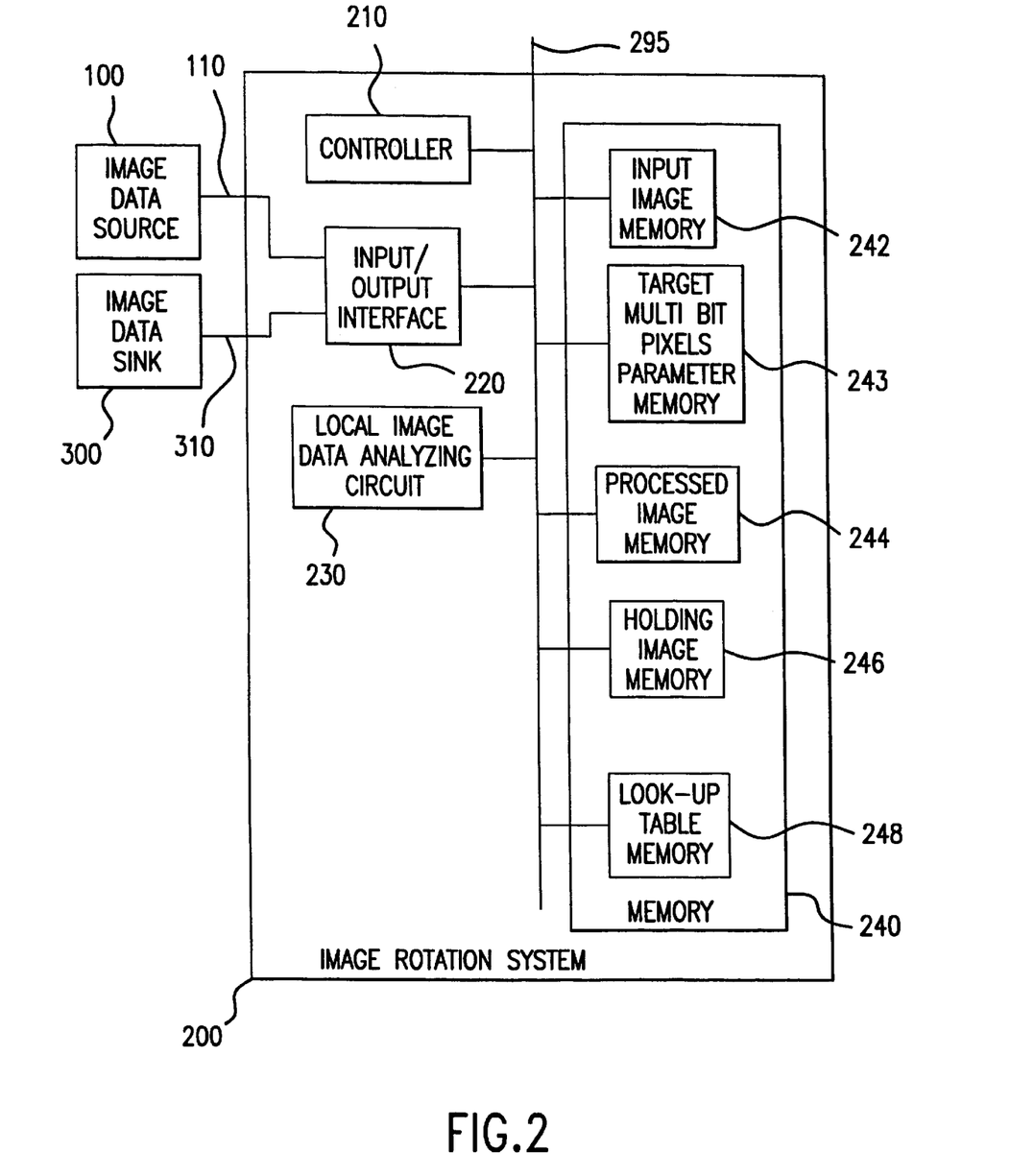
FIG. 2 is a functional block diagram of one exemplary embodiment of an image rotation system in accordance with this invention.

FIG. 2 shows one exemplary embodiment of a generalized functional block diagram of an image rotation system 200 according to this invention. The image rotation system 200 is connected to an image data source 100 over a signal line or link 110 and to an image data sink 300 over a signal line or link 310. The image data source 100 provides a wide variety of image data to the image rotation system 200. The image data sink 300 receives processed images output by the image rotation system 200.

In general, the image data source 100 can be any one of a number of different sources, such as a scanner, a digital copier, a facsimile device, or any other known or later developed device that is suitable for generating electronic image data, or any known or later developed device suitable for storing and/or transmitting electronic image data, such as a client or server of a network. Further, the image data source 100 does not necessarily have to be a single device, but rather may be formed by two or more separate devices.

Thus, the image data source 100 can be any known or later developed source that is capable of providing monochrome or color data to the image rotation system 200 of this invention. Similarly, the image data sink 300 can be any known or later developed device that is capable of receiving the processed image data output by the image rotation system 200 and either storing, transmitting, and/or displaying that processed image data. Thus, the image data sink 300 can be either or both of a channel device for transmitting converted image data or enhanced image data, for example, for display or storage or a storage device for indefinitely storing the image data until there arises a need to display or further transmit the image data.

Further, the image data sink 300 or channel device can be any known structure or apparatus for transmitting the image data from the image rotation system 200 to a physically remote storage or display device. Thus, the channel device can be a public switched telephone network, a local or wide area network, an intranet, the Internet, a wireless transmission channel, any other distributing network, or the like.

Similarly, the storage device can be any known structural apparatus for indefinitely storing the image data, such as a RAM, a hard drive and disk, a floppy drive and disk, an optical drive and disk, a flash memory, or the like. Finally, the display device can be any known device for displaying or rendering an image. Thus, the display device can be a CRT, an active or passive matrix LCD, an active or passive LED display, a laser printer, an ink jet printer, a digital copier, or the like.

Moreover, the image data source 100 and the image data sink 300 can be physically remote from the image rotation system 200 and reachable over the channel device described above. Alternatively, the image rotation system 200 can be integrated with either or both of the image data source 100 and the image data sink 300. For example, the image data source 100 can be a scanner of a digital photocopier, while the image data sink 300 is an image output terminal of the digital copier.

As shown in FIG. 2, the image rotation system 200 includes a controller 210, an input/output interface 220, a local image data analyzing circuit 230 and a memory 240, each of which is connected to a data bus 295. The input/output interface 220 is also connectable to the image data source 100 and the image data sink 300 over the signal lines or links 110 and 310, respectively.

As shown in FIG. 2, the memory 240 includes an input image memory 242, a target multi-bit pixel parameters memory 243, a processed image memory 244, a holding image memory 246, and a look-up table memory 248. The input image memory 242 temporarily stores image data, prior to rotation, that has been input into the image rotation system 200. The target multi-bit pixel parameters memory 243 stores information obtained from an observed target pixel and its corresponding neighborhood. The processed image memory 244 temporally stores rotated image data that has been processed by the image rotation system 200 prior to outputting the rotated image. The holding image memory 246 stores image data on a long term basis either before or after rotation. The image data may be input from the image data source 100 through the input/output interface 220, or, alternatively, may result from converting an image previously stored in the image rotation system 200, and specifically stored in the holding image memory 246. The look-up table memory 248 stores an appropriate look-up table for transforming an image that is to be rotated.

The memory 240 also stores any necessary control programs and/or data required by the image rotation system 200. Thus, the memory 240 can be implemented using static or dynamic RAM, a floppy disk and disk drive, a writable optical disk and disk drive, a hard disk and disk drive, flash memory, or the like. The memory 240 can also include read only memory, including PROMs, EPROMs, EEPROMs, a CD-ROM and disk drive, or the like.

In accordance with the systems and methods of this invention, a high addressability binary image may be rotated using the image rotation system 200 shown in FIG. 2. In particular, the image rotation system 200 may be used to rotate a high addressability binary image comprising high addressability bit pixels, while minimally degrading the image during rotation.

Figure 3:
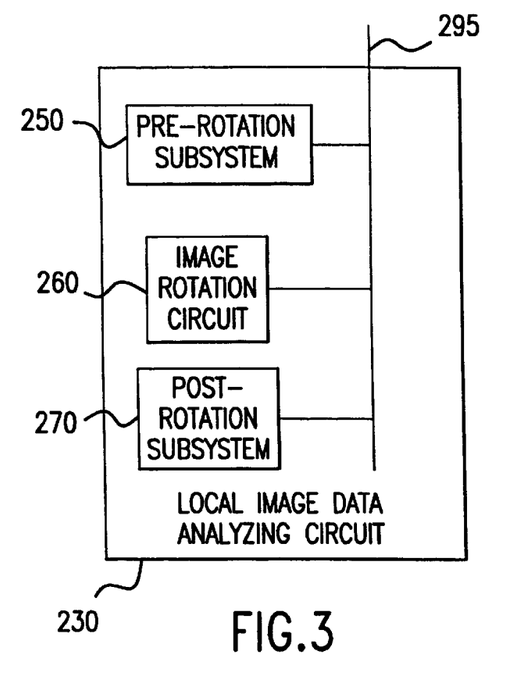
FIG. 3 shows in greater detail one exemplary embodiment of a functional block diagram of the local image data analyzing circuit of FIG. 2 in accordance with this invention.

FIG. 3 shows in greater detail one exemplary embodiment of a functional block diagram of the local image data analyzing circuit 230 of FIG. 2. As shown in FIG. 3, the local image data analyzing circuit 230 includes a pre-rotation subsystem 250, an image rotation circuit 260 and a post-rotation subsystem 270. The pre-rotation subsystem 250 analyzes the image data prior to rotating the image in accordance with one exemplary embodiment of the systems and methods of the invention. The image rotation circuit 260 rotates the image. After the image has been rotated, the post-rotation subsystem 270 processes the rotated image to generate an output image. This processing may include a bit re-definition, for example. The pre-rotation subsystem 250, the image rotation circuit 260 and the post-rotation subsystem 270 are all connected to the data bus 295.

Figure 4:
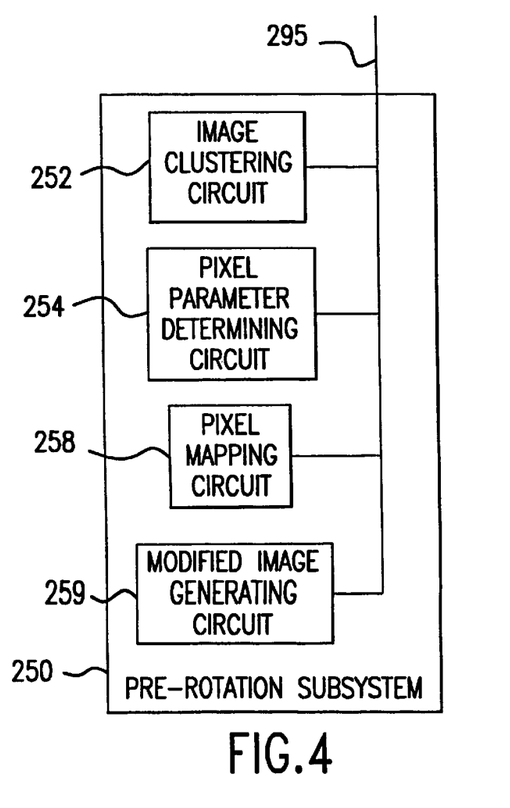
FIG. 4 shows in greater detail one exemplary embodiment of a functional block diagram of the pre-rotation subsystem of FIG. 3 in accordance with this invention.

FIG. 4 shows in greater detail one exemplary embodiment of a functional block diagram of the pre-rotation subsystem 250 of FIG. 3. As shown in FIG. 4, the pre-rotation subsystem 250 includes an image clustering circuit 252, a pixel parameter determining circuit 254, a pixel mapping circuit 258, and a modified image generating circuit 259, each connected to the data bus 295. The image clustering circuit 252 redefines the input original high addressability binary image to generate a multi-bit pixel image. Specifically, the image clustering circuit 252 transforms the original high addressability binary pixels in the original image to a multi-bit pixel image by clustering groups of high addressable binary pixels into multi-bit pixels. In one exemplary embodiment of the systems and methods of this invention, the multi-bit pixels are isomorphic pixels. That is, the spatial resolution of the multi-bit pixels is the same in both the fast-scan and slow-scan directions. However, as discussed in greater detail below, the multi-bit pixels do not have to be formed in isomorphic groups. The pixel parameter determining circuit 254 determines various parameters of an observed pixel pattern in the multi-bit pixels image that is to be rotated. The pixel mapping circuit 258 uses various information to generate modified multi-bit pixels that correspond to input multi-bit pixels. The pixel mapping circuit 258 uses information obtained by the pixel parameter determining circuit 254. The modified image generating circuit 259 compiles a modified image from the modified pixels.

Figure 5:
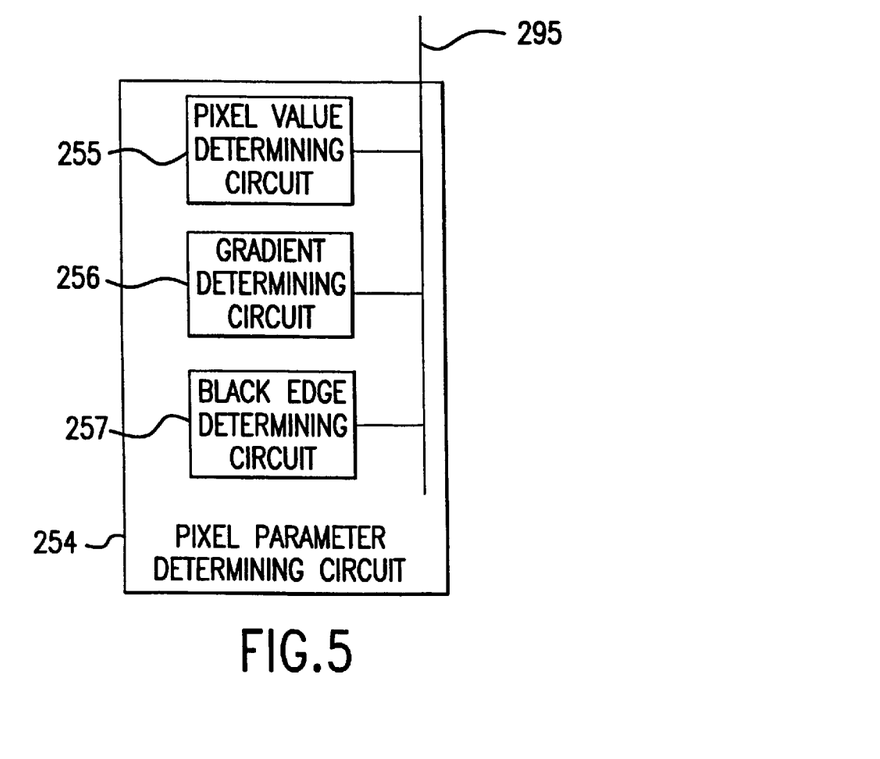
FIG. 5 shows in greater detail one exemplary embodiment of a functional block diagram of the pixel parameter determining circuit of FIG. 4 in accordance with this invention.

FIG. 5 shows in greater detail one exemplary embodiment of a functional block diagram of the pixel parameter determining circuit 254 of FIG. 4. As shown in FIG. 5, the pixel parameter determining circuit 254 includes a pixel value determining circuit 255, a gradient determining circuit 256, and a black edge determining circuit 257, each connected to the data bus 295. The pixel value determining circuit 255 determines the value of an observed pixel pattern in the multi-bit pixel image. The gradient determining circuit 256 determines the local gradient of a target multi-bit pixel in the multi-bit pixel image, based on the multi-bit pixels that neighbor the target multi-bit pixel. The black edge determining circuit 257 determines if the target multi-bit pixel is adjacent to or contains a black edge in the multi-bit pixel image.

Figure 6:
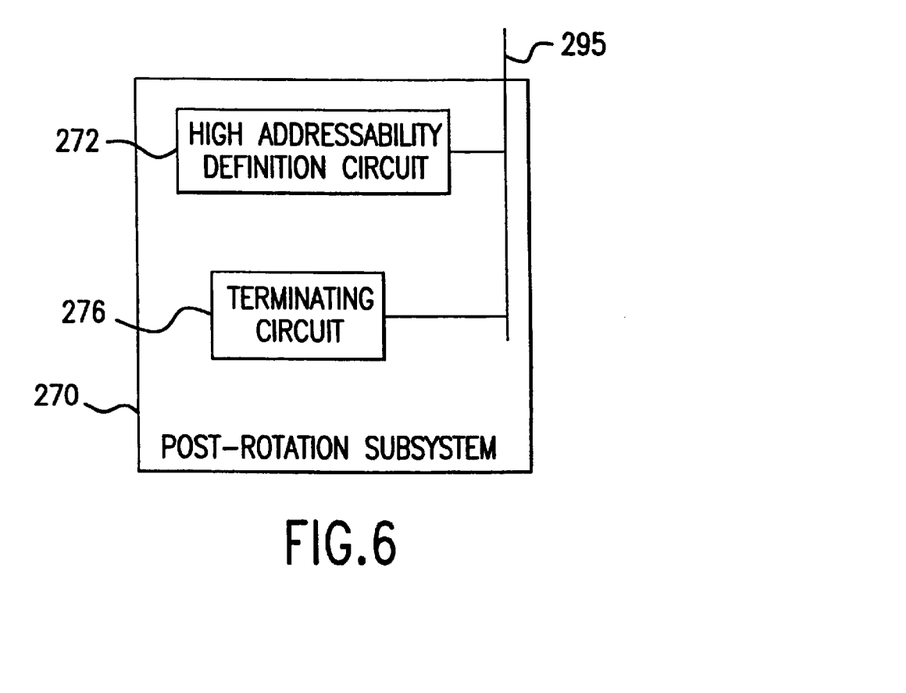
FIG. 6 shows in greater detail one exemplary embodiment of a functional block diagram of the post-rotation subsystem of FIG. 3 in accordance with this invention.

FIG. 6 shows in greater detail one exemplary embodiment of a functional block diagram of the post-rotation subsystem 270 of FIG. 3. As shown in FIG. 6, the post-rotation subsystem 270 includes a high addressability redefinition circuit 272 and a terminating circuit 276, each connected to the data bus 295. The high addressability redefinition circuit 272 redefines the rotated multi-bit pixels after rotation by the image rotation circuit 260. That is, the high addressability redefinition circuit 272 re-defines the bits of each multi-bit pixel to be bits of a number of high addressability bit pixels. Additionally, the terminating circuit 276 terminates the rotation process and outputs or stores the processed image after rotation.

In operation, an image to be rotated, i.e., an "original image", is input into the image rotation system 200 or, alternatively, retrieved from the holding image memory 246 of the image rotation system 200. In this exemplary embodiment, the original image is a high addressability binary image.

The original high addressability binary image to be rotated includes high addressability pixels, i.e., high addressability binary pixels. As a result, the original high addressability binary image is an anamorphic image. That is, the resolution of the original high addressability binary image in the horizontal direction, the fast scan direction, is finer than the resolution in the vertical direction, the slow scan direction, for example.

After inputting the original high addressability binary image, the pre-rotation subsystem 250 converts the high addressability binary pixel image to a multi-bit pixel image. To accomplish this process, the image clustering circuit 252 of the pre-rotation subsystem 250 performs a clustering process, for example, on the original high addressability binary image. The image clustering circuit 252 may be characterized as an operator or device that transforms one image, i.e., the original high addressability binary image comprising of high addressability binary pixels, into another image, i.e., an image comprising of multi-bit pixels. The image clustering circuit 252 in accordance with this exemplary embodiment of the systems and methods of the invention transforms certain groups of high addressability binary pixels in the high addressability binary image, i.e., in a windowed portion of the high addressability binary image, into corresponding multi-bit pixels. The windowed neighborhood may include various numbers of the high addressability binary pixels, such as, for example, four or eight pixels. The window may be a 4×1 or a 8×1 window, to observe 4 or 8 high addressability binary pixels, respectively, in the fast scan direction. Processing using the image clustering circuit 252 results in a multi-bit pixel image.

Figure 7:
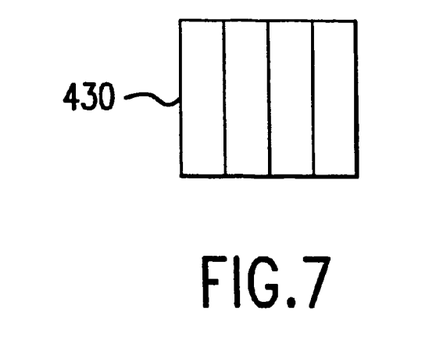
FIG. 7 is a diagram showing one exemplary high addressability window to observe high addressability binary pixels in accordance with this invention.

Accordingly, the image clustering circuit 252 in accordance with the invention uses a window to scan across the original high addressability binary image. The image clustering circuit 252 moves the window from observed neighborhood to observed neighborhood. As shown in FIG. 7, the window may be a 4×1 window 430, which spans 4 high addressability pixels. Alternatively, the window may use any of a wide variety of one-dimensional sizes to effectively observe the high addressability pixels of the original high addressability binary image. The neighborhood includes all the pixels in the window, i.e., a pixel group. For each neighborhood, the image clustering circuit 252 clusters the high addressability pixels appearing in the window into a single multi-bit pixel.

Figure 8:
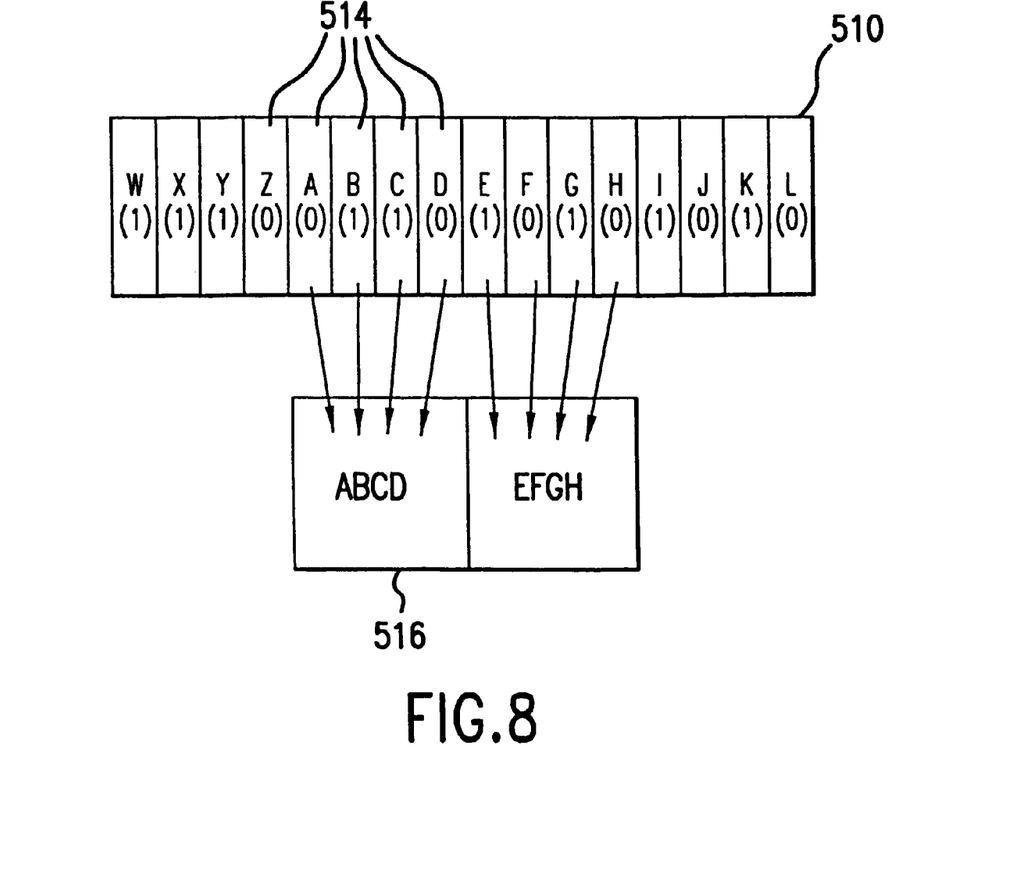
FIG. 8 is a diagram illustrating a re-definition process in accordance with this invention.

FIG. 8 is a diagram illustrative of the clustering performed by the image clustering circuit 252. FIG. 8 shows a raster line 510 and a multi-bit pixel 516. Digital images are typically written one line at a time in a sweep of a laser, for example. These lines are referred to as raster lines. The raster line 510 includes a string of high addressability binary pixels 514 arranged along the raster line 510. Specifically, the raster line 510 includes a plurality of high addressability binary pixels W, X, Y, Z, A, B, C, D, E, F, G, H, I, J, K and L. The high addressability binary pixels will either be on or off, i.e., will be assigned a "1" or a "0". The high addressability binary pixels in the raster line 510 are 4× high addressability binary pixels, i.e., four times as many pixels occur per unit area in the fast scan direction as in the slow scan direction.

Further, the multi-bit pixel 516 contains what may be characterized as a multi-bit word, "ABCD". The image clustering circuit 252 transforms or concatenates a portion of the raster line 510, for example, the string of high addressability binary pixels A, B, C and D, into a unit or pixel group, i.e., the multi-bit pixel 516. The multi-bit pixel 516 may also be characterized as a concatenation. It should be recognized that the multi-bit pixel 516 possesses an isomorphic shape. Thus, an image comprising the multi-bit pixels 516 may be treated as an isomorphic image for rotation. However, the multi-bit pixel 516 still contains all the information of the high addressability bit pixels 514 A–D. This multi-bit pixel 516 is then modified to optimize the rotation of the high addressability image in accordance with the systems and methods of the invention, as described below.

Accordingly, the image clustering circuit 252 transforms the high addressability binary original image to a multi-bit pixel image by progressively analyzing series of high addressability binary pixels. This process may continue until the last pixel in the original image is analyzed. As a result, the N bits of high addressability in N high addressability binary pixels are reinterpreted as a single N-bit multi-bit pixel, where N=4 for a "4×" high addressability image. Further, it should be recognized that the image clustering circuit 252 does not necessarily analyze or observe one row of high addressability pixels at a time. Alternatively, the image clustering circuit 252 may analyze two rows at a time. Such a process could be performed using two independent 4×1 high addressability windows.

After the image clustering circuit 252 generates the multi-bit pixels image, the pixel parameter determining circuit 254 analyzes the multi-bit pixel image to obtain various information about the image. That is, the pixel value determining circuit 255 in the pixel parameter determining circuit 254 analyzes the multi-bit pixel image to determine pixel value information. Specifically, the pixel value determining circuit 255 analyzes the multi-bit pixel image by progressively analyzing the image moving from one target multi-bit pixel to the next target multi-bit pixel. The pixel value determining circuit 255 accomplishes this process using an appropriate window to determine pixel value information for respective target multi-bit pixels. Illustratively, a 3×3 multi-bit pixel window may be used with the target multi-bit pixel at (1,1).

Figure 9:
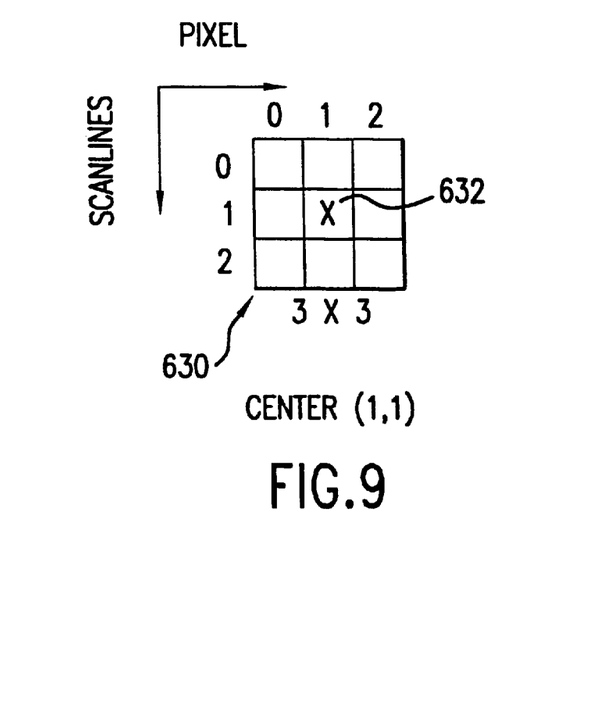
FIG. 9 is a diagram showing one exemplary window to observe multi-bit pixels in accordance with this invention.

For example, as shown in FIG. 9, the window may be a 3×3 multi-bit pixel window 630, which spans 9 multi-bit pixels. Alternatively, the window may use any of a wide variety of shapes and sizes to effectively observe the multi-bit pixels. The neighborhood includes all the multi-bit pixels in the window, i.e., a multi-bit pixel group. Further, a target multi-bit pixel 632 may be the center multi-bit pixel of the multi-bit pixel group. For example, in the 3×3 multi-bit window 630 shown in FIG. 9, the target multi-bit pixel will be at the coordinates (1,1). For each target multi-bit pixel, the pixel value determining circuit 255 observes the multi-bit pixel group appearing in the window, i.e., the target multi-bit pixel and the neighborhood of multi-bit pixels surrounding the target multi-bit pixel.

The 3×3 window observes three multi-bit pixels in the horizontal direction and three multi-bit pixels, i.e., or scan lines, in the vertical direction. For each target multi-bit pixel, the pixel value determining circuit 255 observes the neighborhood information and determines the multi-bit pixel value for each target multi-bit pixel. As used herein, the term multi-bit pixel value pertains to the parameters associated with the multi-bit pixel, such as, for example, the multi-bit pixel 516 as shown in FIG. 8. Alternatively, the pixel value determining circuit 255 may simply observe the target multi-bit pixel and its corresponding pixel value, without observing the neighboring multi-bit pixels. The pixel value determining circuit 255 then assigns the multi-bit pixel value to the target multi-bit pixel. The pixel value determining circuit 255 stores the multi-bit pixel value information in the target multi-bit pixel parameters memory 243 for each target multi-bit pixel.

Accordingly, as described above, the image clustering circuit 252 transforms the original high addressability binary image into a multi-bit pixel image. Then, the pixel parameter determining circuit 254 further prepares the generated image for rotation. In particular, the pixel value determining circuit 255, the gradient determining circuit 256 and the black edge determining circuit 257 of the pixel parameter determining circuit 254 further prepare the multi-bit pixel image for rotation.

It should be recognized that the multi-bit pixel image generated by the image clustering circuit 252 is formed by bits of information. As a result, the multi-bit pixels may be characterized as possessing an overall gray level or a gray density. It should be appreciated that the overall gray level of a target pixel group is maintained while the pixel group is processed by the pixel mapping circuit 258. However, while the overall gray level is maintained, the pixel mapping circuit 258 manipulates the positioning of the bits in the target pixel window. This re-positioning is performed in a specific manner to generate a modified image that is optimized for the desired rotation. The repositioning is performed using various information obtained by the pixel parameter determining circuit 254, including edge information and gray level information, as well as the angle of rotation, as described below.

After the pixel value determining circuit 255 determines the multi-bit pixel value information for the multi-bit pixels in the image, or alternatively, a portion of the image, the gradient determining circuit 256 in the pixel parameter determining circuit 254 analyzes the multi-bit pixel image to determine gradient information. Gradient information may also be characterized as slope information. The gradient determining circuit 256 analyzes the multi-bit pixel image moving from target multi-bit pixel to target multi-bit pixel using an appropriate window. Illustratively, the 3×3 window described above may be used. Alternatively, a 1×3 window may be used with the center, i.e., the target pixel, at (0,1). The 1×3 window observes one pixel in the horizontal direction and three multi-bit pixels or scan lines in the vertical direction.

The 3×3 multi-bit window, for example, defines a 9-multi-bit-pixel region of interest about a central multi-bit pixel, i.e., the target multi-bit pixel. For each multi-bit pixel, the gradient determining circuit 256 observes the multi-bit pixel above the target multi-bit pixel and the multi-bit pixel below the target multi-bit pixel. Based on this observation, the gradient determining circuit 256 determines if a boundary exists between light and dark portions in the region of interest. If the gradient determining circuit 256 determines that a boundary exists, the gradient determining circuit 256 then determines if the slope of the boundary is positive or negative. It should be noted that a zero or infinite slope defines a "don't care" state, such that no firther processing prior to rotation is applied. Accordingly, it should be apparent that, while the gradient determining circuit 256 observes and analyzes all the target multi-bit pixels in the image, the analysis of some of the target multi-bit pixels will end there. That is, the process would end for that multi-bit pixel if a zero or infinite slope is determined. Such multi-bit pixels will not be processed by the black edge determining circuit 257 or mapped using the look-up table, for example. These multi-bit pixels, in a sense, are already optimized for rotation.

Accordingly, the gradient determining circuit 256 determines the sign of the local gradient about each multi-bit pixel by examining the multi-bit pixels directly above and below the target multi-bit pixel. Based on what the gradient determining circuit 256 observes, the analysis of a target multi-bit pixel will continue or terminate. The particular manner in which the sign of the local gradient is determined may differ depending on the particular application.

Illustratively, the gradient determining circuit 256 may determine the difference between each of the image values, i.e., density as derived from the binary values contained in the multi-bit pixels, of the neighboring multi-bit pixels. This information may provide a suitable measure of the gradient sign. Specifically, the gradient determining circuit 256 determines the difference between the image value of the target multi-bit pixel and the image value of the multi-bit pixel above the target multi-bit pixel. Further, the gradient determining circuit 256 determines the difference between the image value of the target multi-bit pixel and the image value of the multi-bit pixel below the target multi-bit pixel. Based on this information, the gradient determining circuit 256 determines the sign of the local gradient of the image value for that target multi-bit pixel. The gradient determining circuit 256 stores the sign of the local gradient for that target multi-bit pixel in the target multi-bit pixel parameters memory 243.

It should be recognized that the gradient determining circuit 256 may determine the sign of the local gradient about each target multi-bit pixel using techniques other than simply comparing the target multi-bit pixel with the multi-bit pixels above and below the target multi-bit pixel, respectively. Illustratively, the gradient determining circuit 256 may compare two multi-bit pixels above the target multi-bit pixel with the target multi-bit pixel, as well as two multi-bit pixels below the target multi-bit pixel.

Once the local gradient is determined as described above, and the gradient determining circuit 256 determines that there is not a "don't care" state, the black edge determining circuit 257 analyzes the multi-bit pixel image. Specifically, the black edge determining circuit 257 determines the presence of black edges for each respective target multi-bit pixel. Illustratively, the black edge determining circuit 257 uses the 3×3, multi-bit window described above.

In accordance with one exemplary embodiment of the systems and methods of the invention, the black edge determining circuit 257 observes the multi-bit pixels to the left and the right of the target multi-bit pixel in the multi-bit pixel image. Based on this observation, the black edge determining circuit 257 determines if the target multi-bit pixel is adjacent to a black edge. In other words, the multi-bit pixels adjacent to the target multi-bit pixel in the fast scan direction are tested for the existence of a boundary.

For example, the black edge determining circuit 257 may observe that the multi-bit pixel to the right of the target multi-bit pixel has an image value, i.e., density derived from the binary values contained in the multi-bit pixel, of 0, i.e., there are all 0s in the multi-bit pixel, and that the multi-bit pixel to the left of the target multi-bit pixel has an image value of "2", i.e., there are all "1"s in the multi-bit pixel. As a result, the black edge determining circuit 257 determines that the target multi-bit pixel is adjacent to a black edge. The black edge determining circuit 257 then stores this black edge information for the analyzed multi-bit target pixel in the target multi-bit pixel parameters memory 243.

It should further be recognized that the systems and methods of this invention are not limited to first determining the local gradient information and then the black edge information. Rather, the black edge information could be determined first and then the local gradient information could be determined.

As described above, the multi-bit pixels in the multi-bit pixel image are analyzed to determine the local gradient information and black edge information. However, it should be recognized that the invention is not limited to such analysis. That is, the local gradient information and the black edge information may both be characterized as higher level attributes of the neighboring multi-bit pixels surrounding the target multi-bit pixel, which is being analyzed. These higher level attributes are derived form the actual pixel values of the surrounding pixels. However, in accordance with the systems and methods of the invention, it is not necessary to use the higher level attributes. Instead, the actual pixel values of the neighboring pixels may be used, for example.

Illustratively, in accordance with one embodiment of the systems and methods of the invention, the multi-bit pixels in the multi-bit pixel image each contain 4× of high addressability pixels. An appropriate window is used to observe a central multi-bit pixel, as well as the multi-pixel directly above, below, and to each side of the central multi-bit pixel. Thus, 5 multi-bit pixels are observed in total. Each multi-bit pixel contains 4 bits of information. As a result, the windowed neighborhood of 5 multi-bit pixels contains 20 bits of information. In accordance with this exemplary embodiment of the systems and methods of the invention, this information is concatenated into a 20-bit string, i.e., a 20 bit-word. Then, the 20-bit string is directly input into the look-up table. The look-up table modifies the input concatenation based on the information in the input concatenation itself. Specifically, the look-up table modifies the input 20-bit concatenation to generate a modified 4-bit concatenation for the multi-bit target pixel, which is optimized for rotation of the image.

As a result, in accordance with the systems and methods of the invention, the pixel value determining circuit 255 stores the pixel value information in the target multi-bit pixel parameters memory 243, the gradient determining circuit 256 stores the local gradient information in the target multi-bit pixel parameters memory 243 and the black edge determining circuit 257 stores the black edge information in the target multi-bit pixel parameters memory 243. The pixel mapping circuit 258 in the pre-rotation subsystem 250 uses this stored information, for each target multi-bit pixel, as an input into a look-up table stored in the look-up table memory 248.

Specifically, the pixel mapping circuit 258 uses the gradient sign, black edge information, and input pixel value for each target multi-bit pixel as the input value into the look-up table. By using this input information, the pixel mapping circuit 258 indexes, for each target multi-bit pixel, a preferred or modified value that is stored within a look-up table. The indexed modified multi-bit pixel, i.e., the modified multi-bit pixel, is defined such that the modified multi-bit pixel may be rotated in an optimal manner.

The pixel mapping circuit 258, using the look-up table, essentially, modifies the bit word within the multi-bit pixel, such as, for example, the bit word "ABCD" in the multi-bit pixel 516 shown in FIG. 8. This modification is performed in a specific manner to generate a modified image that is optimized for the desired rotation. The modification is performed using the information obtained by the pixel parameter determining circuit 254, including one or more of the edge information and pixel value information, and the angle of rotation. For example, the bit word "ABCD" as shown in FIG. 8 is representative of the binary values "0110". This bit word may be transformed by the pixel mapping circuit 258 into the binary values "0011". Thus, the modified bit word might be "A'B'C'D'", for example. The modified bit word "A'B'C'D" is modified for optimum rotation.

It should be recognized that the pixel mapping circuit 258 may use information other than the input pixel value, the gradient sign and the black edge information for each pixel as the input value into the look-up table stored in the look-up table memory 248. Illustratively, the pixel mapping circuit 258 may also or alternatively use the angle that the image is to be rotated. Specifically, the pixel mapping circuit 258 may use the look-up table based on the position of a rotation flag that indicates the direction of rotation, for example, +/−90°. Thus, the pixel mapping circuit 258 may further optimize the output modified pixel values based on the rotation angle. Accordingly, a rotation of +90° may generate different modified pixel values than a rotation of −90°.

The look-up table stored in the look-up table memory 248 in accordance with the systems and methods of the invention may be generated in any suitable manner. For example, the look-up table may be generated using statistical optimization techniques to map the input values to modified output values. A look-up table is a collection or list of possible templates or pixel patterns. The templates in the look-up table are compared with observed values in a windowed neighborhood or pixel group of an image to be transformed or converted. That is, the pixel mapping circuit 258 may use filters that operate by outputting a specified bit word "A'B'C'D'" at locations where a particular binary pattern, e.g., "A'B'C'D'" is observed within the image.

As an alternative to statistical optimization techniques, the look-up table may be generated using expert knowledge. Specifically, the mapping of the look-up table may be designed through expert selection of input and output patterns based on extensive experimentation. The systems and methods of the invention have been shown to perform well for a wide variety of scanned images containing text and line graphics.

Also, it should be recognized that the look-up table does not necessarily have to be a full look-up table. Alternatively, a sparse look-up table may be utilized. As should be recognized, the sparse look-up table would be smaller than the full look-up table. Further, the sparse look-up table would rely on conventional techniques, such as, for example, averaging and other interpolation, for input values that are not explicitly defined on the sparse look-up table.

The pixel mapping circuit 258 in accordance with the invention is not limited to using a look-up table. Alternatively, the pixel mapping circuit 258 may accomplish the mapping using a system of equations that processes information regarding the properties of a particular input pixel to generate a modified output pixel value. For example, a Boolean logic technique may be employed using a logical sum of products. Alternatively, it should be recognized that the mapping may be accomplished using expert knowledge in a wide variety of ways to relate input patterns to desired rotated output patterns.

To explain further, the pixel mapping circuit 258 transforms an input multi-bit pixel to a modified multi-bit pixel using what may be referred to as a filter. The filter may be in the form of a set of logic tests or look-up tables, for example, such that an observed multi-bit pixel in a region of interest is replaced with a modified multi-bit pixel, based on various input parameters. The modified multi-bit pixel is designed to provide optimum rotation. For example, the modified multi-bit pixel minimizes the occurrence of outlying pixels when the byte map is converted back to an N× high addressability binary image for printing. The "filter" used by the pixel mapping circuit 258 may be referred to as a gray filter. A gray filter is a filter that processes multi-bit pixels.

In accordance with the exemplary embodiment of the systems and methods of the invention described above, the pixel mapping circuit 258 maps the input multi-bit pixel values to the output modified multi-bit pixel values before rotating the image. However, the pixel mapping circuit 258 does not necessarily have to map the input multi-bit pixel values to the output modified multi-bit pixel values prior to rotation. The mapping could be performed pre-rotation, post-rotation or even during rotation if the look-up table, for example, was suitably modified.

The modified image generating circuit 259 of the pre-rotation subsystem 250 works in conjunction with the pixel mapping circuit 258. Specifically, as described above, the pixel mapping circuit 258 generates modified multi-bit pixel values based on input multi-bit pixel values. As the pixel mapping circuit 258 performs this analysis, the modified image generating circuit 259 collects the modified multi-bit pixel values. The modified image generating circuit 259 assigns the modified multi-bit pixel values to the corresponding pixel position. As a result, the modified image generating circuit 259 generates a full modified multi-bit pixel image formed by multi-bit pixels possessing modified values, i.e., the desired values optimized for rotation.

It should be recognized that the systems and methods in accordance with the invention do not necessarily have to work with, i.e., analyze, the full or complete image that is input. Rather, the systems and methods may analyze only a portion or a segment of the image, such as text or line art.

After the modified image generating circuit 259 generates the full image, or a selected portion of an image, for example, the modified multi-bit pixel image formed by the modified pixels is rotated. Specifically, the image rotation circuit 260 in the local image data analyzing circuit 230 rotates the modified multi-bit pixel image using any one or more of a variety of known or later developed rotation processes. In performing the rotation, the image rotation circuit 260 performs the conventional rotation treating the modified image as an isomorphic image possessing modified multi-bit pixels.

Figure 10:
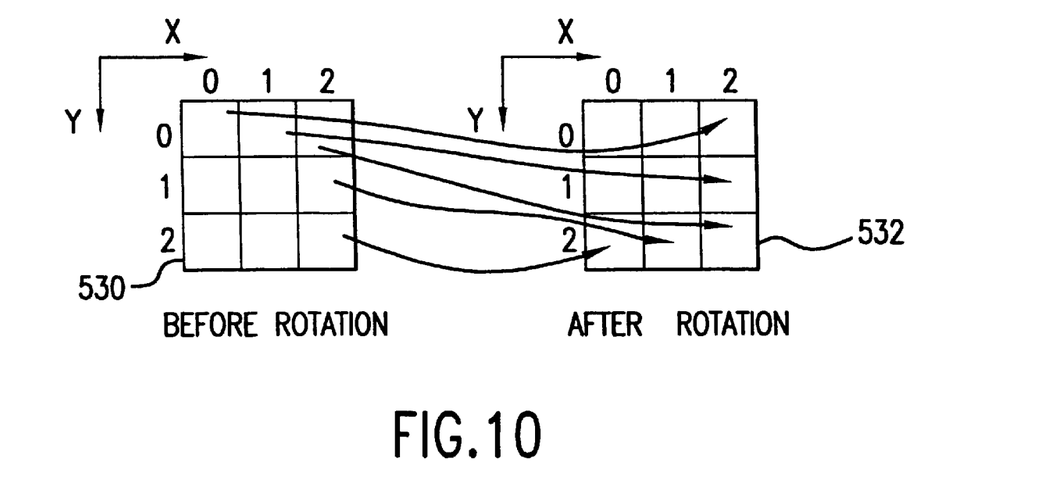
FIG. 10 is a diagram showing one exemplary mapping technique in accordance with this invention.

Illustratively, FIG. 10 shows two pixel grids. In accordance with the systems and methods of the invention, each "pixel" as shown in FIG. 10 is a modified multi-bit pixel. The pre-rotation grid 530 shows an arrangement of the multi-bit pixels before rotation. Further, the post-rotation grid shows an arrangement of multi-bit pixels after rotation by +90°. Each of the multi-bit pixels in the pre-rotation grid 530 is denoted by $P_{BR}(x,y)$, where x=0–2 in the x-direction and y=0–2 in the y-direction. Further, each of the multi-bit pixels in the post-rotation grid 532 is denoted by $P_{AR}(x,y)$, where x=0–2 in the x-direction and y=0–2 in the y-direction. To rotate the grid 530 by +90°, the image rotation circuit 260 uses a mapping technique. Specifically, to rotate the grid 530 +90°, the image rotation circuit 260 maps the multi-bit pixels as follows:

$P_{BR}(0,0)$ to $P_{AR}(2,0)$;
$P_{BR}(1,0)$ to $P_{AR}(2,1)$;
$P_{BR}(2,0)$ to $P_{AR}(2,2)$;
$P_{BR}(0,1)$ to $P_{AR}(1,0)$;
$P_{BR}(1,1)$ to $P_{AR}(1,1)$;
$P_{BR}(2,1)$ to $P_{AR}(1,2)$;
$P_{BR}(0,2)$ to $P_{AR}(0,0)$;
$P_{BR}(1,2)$ to $P_{AR}(0,1)$; and
$P_{BR}(2,2)$ to $P_{AR}(0,2)$.

Once the modified multi-bit pixel image is rotated, the rotated modified multi-bit pixel image is processed by the post-rotation subsystem 270. The post-rotation subsystem 270 re-defines each of the bits of each modified multi-bit pixel to be the single bit of a high addressability binary pixel. In other words, each rotated multi-bit pixel is re-interpreted as a set of N high addressability binary pixels, for example, which may be printed, for example. This may be accomplished using the reverse of the process as described and illustrated in conjunction with FIG. 8.

As a result of the re-definition process performed by the high addressability definition circuit 272, a rotated high addressability binary image is generated. This rotated high addressability binary image may be directly output by the terminating circuit 276 to the image data sink 300. Alternatively, the terminating circuit 276 may store the image in the holding image memory 246.

In accordance with this illustrative example using the image rotation system 200, the process according to the invention is performed using a suitably programmed general purpose computer. However, it should be recognized that the systems and methods of the invention are not limited to application using a general purpose computer. Rather, the systems and methods according to the invention may be implemented using any suitable arrangement of electronic and imaging components, expert knowledge, or alternatively, a mixture of electronic and imaging components in conjunction with expert knowledge. Further, it should be recognized that the processes in accordance with the systems and methods of the invention may be performed by hand, using hand calculations, for example.

The image rotation process according to the invention may be applied to a variety of applications and environments. Further, it should be recognized that numerous variations of the systems and methods in accordance with the invention may be performed using the general process described in conjunction with FIGS. 2–6.

Accordingly, systems and methods in accordance with one exemplary embodiment of the invention provide a pre-rotation filter. The pre-rotation filter employs a window to distort or modify the high addressability pixels, or groups of pixels, in a manner such that they possess a desirable structure for optimally rotating an observed image. In other words, the systems and methods of the invention provide a pre-rotation filter that prepares all or part of the original high addressability binary image for rotation. Then, a conventional isomorphic rotation process is applied to the image since the re-defined high addressability binary pixels, i.e., the multi-bit pixels, are more or less isomorphic for purposes of rotation. Typically, the pre-rotation filter of the invention realigns the bits of the image so edges will be compact as possible after rotation, i.e., so that the edge integrity will be maintained.

The systems and methods in accordance with the exemplary embodiments of the invention, as set forth above, describe isomorphic multi-bit pixels. For example, the multi-bit pixel 516, as shown in FIG. 8, illustrates such an isomorphic multi-bit pixel. However, it should be recognized that the systems and methods of the invention are not limited to clustering the high addressability pixels, in an original binary image, to isomorphic multi-bit pixels. Rather, anamorphic multi-bit pixels may be used as the clustered multi-bit pixel group. However, it should be recognized that rotation of anamorphic multi-bit pixels may result in certain abnormalities or errors in the resulting rotated anamorphic multi-bit pixel image. These errors may be similar to magnification errors in nature, for example. However, it may be that these errors can be tolerated in a particular image. Alternatively, the errors may be compensated in some manner in a particular image.

It should be recognized that, in accordance with the exemplary embodiments of the systems and methods of the invention, it is assumed that the same number of bits should be set "on" in the output pixel group as were "on" in the input pixel group. This assumption preserves the pixel density when used on several imaging devices. However, certain printers, for example, may require a different number of "on" bits to account for tone reproduction curve (TRC) effects and the halfbit response associated with more disperse edge patterns.

Figure 11:
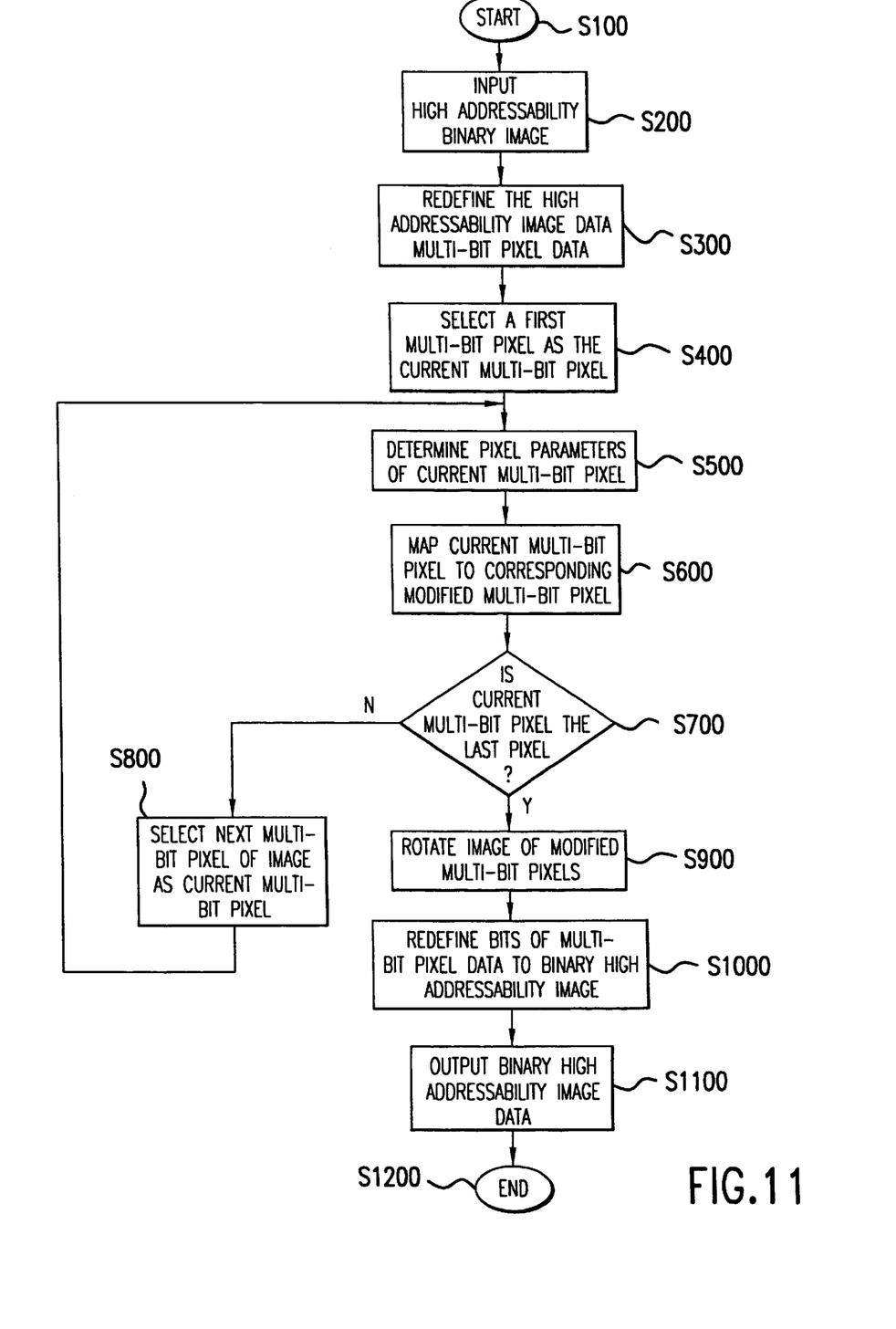
FIG. 11 is a flowchart outlining one exemplary embodiment of a method for rotating a high addressability binary image in accordance with this invention.

FIG. 11 is a flowchart outlining one exemplary embodiment of a rotation method according to this invention. As shown in FIG. 11, the rotation process begins in step S100, and continues to step S200. In step S200, a high addressability binary image is input. Then, in step S300, the high addressability binary image data is re-defined into multi-bit pixel data, i.e., into a multi-bit pixel image. Next, in step S400, the first multi-bit pixel of the multi-bit pixel image is selected as the current pixel. Control then passes to step S500.

In step S500, the pixel parameters of the current multi-bit pixel are determined. Then, in step S600, using the pixel parameters determined in step S500, the current multi-bit pixel is mapped to a corresponding modified multi-bit pixel. Next, in step S700, the current multi-bit pixel is analyzed to determine if it is the last multi-bit pixel in the multi-bit pixel image for analysis. If, in step S700, the current target multi-bit pixel is not the last multi-bit pixel for analysis of the multi-bit pixel image, control continues to step S800. Otherwise, control jumps to step S900. In step S800, the next target multi-bit pixel is selected as the current multi-bit pixel. Control then returns to step S500.

Once the current target multi-bit pixel is the last target multi-bit pixel in step S700, control jumps to step S900. In step S900, the multi-bit pixel image, including the modified multi-bit pixel, is rotated using a conventional isomorphic rotation technique. Then, in step S1000, the rotated multi-bit pixel image data is re-defined to high addressability binary image data. Next, in step S1100, the processed image is stored or output. Then, in step S1200, the rotation process ends.

Figure 12:
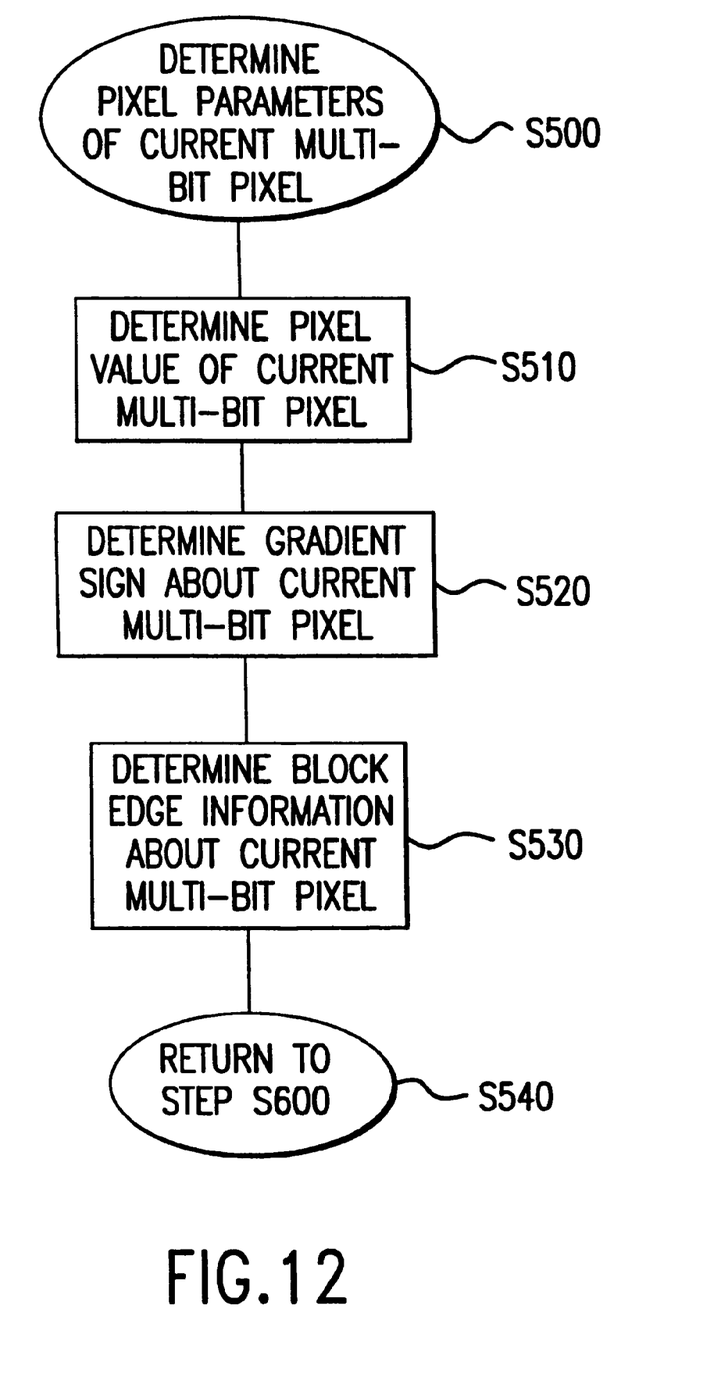
FIG. 12 is a flowchart outlining in greater detail one exemplary embodiment of the determining of pixel parameters for current pixel step of FIG. 11.

FIG. 12 is a flowchart outlining in greater detail one exemplary embodiment of the determining the pixel parameters of the current multi-bit pixel of step S500 as shown in FIG. 11. Beginning in step S500, control continues to step S510. In step S510, the pixel value of the current multi-bit pixel is determined. Then, in step S520, the sign of the gradient about the current multi-bit pixel is determined. Next, in step S530, the black edge information about the current multi-bit pixel is determined. Then, in step S540, control returns to step S600 of FIG. 11.

The image rotation system 200 shown in FIGS. 2–6 is preferably implemented on a programmed general purpose computer. However, the image rotation system 200 shown in FIGS. 2–6 can also be implemented on a special purpose computer, a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA or PAL, or the like. In general, any device, capable of implementing a finite state machine that is in turn capable of implementing the flowcharts shown in FIGS. 11 and 12, can be used to implement the image rotation system 200.

In particular, it should be understood that each of the circuits shown in FIGS. 3–6 can be implemented as portions of a suitably programmed general purpose computer. Alternatively, each of the circuits shown in FIGS. 3–6 can be implemented as physically distinct hardware circuits within an ASIC, or using a FPGA, a PDL, a PLA or a PAL, or using discrete logic elements or discrete circuit elements. The particular form each of the circuits shown in FIGS. 3–6 will take is a design choice and will be obvious and predicable to those skilled in the art.

The memory 240 is preferably implemented using static or dynamic RAM. However, the memory 240 can also be implemented using a floppy disk and disk drive, a writable optical disk and disk drive, a hard drive, flash memory or any other known or later developed alterable volatile or non-volatile memory device or system.

While this invention has been described in conjunction with specific embodiments outlined above, it is evident that many alternative modifications and variations may be apparent to those skilled in the art. Accordingly, the exemplary embodiments of the invention as set forth herein are intended to be illustrative, not limiting. Various changes may be made without departing from the spirit and scope of the invention.

What is claimed is:

1. A method for rotating a high addressability binary image having high addressability pixels, the method comprising:

converting the high addressability pixels in the high addressability binary image to multi-bit pixels, the multi-bit pixels forming a multi-bit pixel image;

determining neighborhood information about selected multi-bit pixels in the multi-bit pixel image;

mapping selected multi-bit pixels to modified multi-bit pixels using the neighborhood information to generate a modified multi-bit pixel image;

rotating the modified multi-bit pixel image; and re-defining the rotated modified multi-bit pixel image to form a rotated high addressability binary image having high addressability pixels.

2. The method according to claim 1, wherein converting the high addressability pixels in the high addressability binary image to multi-bit pixels includes:

observing a neighborhood of high addressability pixels; and clustering the observed neighborhood of high addressability pixels to form a multi-bit pixel.

3. The method according to claim 2, wherein, when the high addressability image has A-by high addressability, observing a neighborhood of high addressability pixels includes using an A-by-1 observation window, where A is an integer.

4. The method according to claim 1, wherein determining neighborhood information about selected multi-bit pixels in the multi-bit pixel image comprises:

observing a neighborhood of multi-bit pixels for each of the selected multi-bit pixels; and generating the neighborhood information based on the observed neighborhood of multi-bit pixels.

5. The method according to claim 4, wherein the neighborhood of multi-bit pixels is observed using a 3×3 multi-bit pixel observation window.

6. The method according to claim 4, wherein the neighborhood information is edge information.

7. The method according to claim 6, wherein the edge information includes gradient information.

8. The method according to claim 7, wherein determining the gradient information comprises:

observing a multi-bit pixel above each selected multi-bit pixel; and observing a multi-bit pixel below each selected multi-bit pixel.

9. The method according to claim 8, wherein generating the neighborhood information based on the observed neighborhood of multi-bit pixels includes determining if a boundary exists adjacent each selected multi-bit pixel.

10. The method according to claim 9, wherein generating the neighborhood information based on the observed neighborhood of multi-bit pixels includes determining, if a boundary exists, if the boundary is positive or negative.

11. The method according to claim 6, wherein the edge information includes black edge information.

12. The method according to claim 11, wherein determining the black edge information comprises:

observing a multi-bit pixel to the right of each selected multi-bit pixel; and observing a multi-bit pixel to the left of each selected multi-bit pixel.

13. The method according to claim 4, wherein the neighborhood information includes multi-bit pixel values of the multi-bit pixels in the neighborhood.

14. The method according to claim 13, wherein each neighborhood comprises a selected multi-bit pixel and 4 multi-bit pixels surrounding the selected multi-bit pixel.

15. The method according to claim 14, wherein, for each neighborhood, generating the neighborhood information based on the observed neighborhood of multi-bit pixels comprises:

combining image information from each of the multi-bit pixels in the neighborhood; and concatenating the image information to form a multi-bit word.

16. The method according to claim 15, wherein the high addressability binary image possesses 4× high addressability, and the multi-bit word is a 20-bit word.

17. The method according to claim 1, wherein the high addressability binary image possesses A-by high addressability, where A is an integer.

18. The method according to claim 17, wherein each multi-bit pixel contains image information from A high addressability binary pixels, where A is an integer.

19. The method according to claim 1, wherein mapping selected multi-bit pixels using the neighborhood information to generate a modified multi-bit pixel image comprises:

inputting the neighborhood information into a template operator; and extracting a corresponding modified multi-bit pixel based on the neighborhood information.

20. The method according to claim 19, wherein the template operator is a look-up table.

21. The method according to claim 20, wherein a degree of rotation is input into the look-up table.

22. The method according to claim 21, wherein the degree of rotation is at least one of 90°, 180°, and 270°.

23. The method according to claim 19, wherein the template operator is a Boolean logic circuit.

24. The method according to claim 1, wherein the multi-bit pixel image is an isomorphic image.

25. An image rotation system that rotates a high addressability binary image, the image rotation system comprising:

an image clustering circuit that clusters the high addressability binary image to generate a multi-bit pixel image;

a pixel parameter determining circuit that determines multi-bit pixel parameter information in the multi-bit pixel image;

a pixel mapping circuit that converts the multi-bit pixel image to a modified multi-bit pixel image;

an image rotation circuit that rotates the modified multi-bit pixel image; and a high addressability definition circuit that converts the rotated modified multi-bit pixel image into a rotated high addressability binary image.

26. The image rotation system according to claim 25, wherein the pixel parameter determining circuit comprises at least one of:

a pixel value determining circuit;

a gradient determining circuit; and a black edge determining circuit.

27. A printer comprising the image rotation system of claim 26.

28. A personal computer comprising the image rotation system of claim 26.

29. A facsimile machine comprising the image rotation system of claim 26.

* * * * *